United States Patent
Colombo et al.

(10) Patent No.: US 6,601,370 B2
(45) Date of Patent: Aug. 5, 2003

(54) RECLOSABLE PACKAGE USING STRAIGHT TEAR FILM AND PROCESS FOR MANUFACTURE

(75) Inventors: Frank J. Colombo, Rochester, NY (US); Jeffrey D. Moulton, Morristown, NJ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 10/115,309

(22) Filed: Apr. 3, 2002

(65) Prior Publication Data

US 2002/0172435 A1 Nov. 21, 2002

Related U.S. Application Data

(62) Division of application No. 09/855,459, filed on May 15, 2001, now Pat. No. 6,390,676.

(51) Int. Cl.[7] ................................. B65B 1/04
(52) U.S. Cl. ................ 53/473; 53/133.4; 53/139.2; 493/214
(58) Field of Search ................. 493/212, 213, 493/214, 927; 53/473, 478, 139.2, 133.4

(56) References Cited

U.S. PATENT DOCUMENTS

| | | | | | |
|---|---|---|---|---|---|
| 5,035,517 | A | * | 7/1991 | Edelman | 383/204 |
| 5,067,208 | A | * | 11/1991 | Herrington et al. | 24/400 |
| 5,482,375 | A | * | 1/1996 | Richardson et al. | 383/64 |
| 5,833,791 | A | * | 11/1998 | Bryniarski et al. | 156/244.25 |
| 5,896,627 | A | * | 4/1999 | Cappel et al. | 24/400 |
| 5,924,173 | A | * | 7/1999 | Dobreski et al. | 24/400 |
| 5,938,337 | A | * | 8/1999 | Provan et al. | 383/5 |
| 6,148,588 | A | * | 11/2000 | Thomas et al. | 53/412 |
| 6,212,857 | B1 | * | 4/2001 | Van Erden | 53/412 |
| 6,327,837 | B1 | * | 12/2001 | Van Erden | 53/412 |
| 6,386,760 | B1 | * | 5/2002 | Tomic | 383/5 |
| 6,412,254 | B1 | * | 7/2002 | Tilman et al. | 53/412 |

* cited by examiner

Primary Examiner—Eugene Kim
(74) Attorney, Agent, or Firm—Roger H. Criss

(57) ABSTRACT

A reclosable film package for storage of solid or liquid food products using a straight-tear film package having a zipper. The straight-tear films allow for tearing of the film along straight lines without perforating or laser scoring of the film allowing optimal integrity of the package and product.

14 Claims, 2 Drawing Sheets

RECLOSABLE PACKAGE USING STRAIGHT TEAR FILM AND PROCESS FOR MANUFACTURE

This application is a divisional of application Ser. No. 09/855,459 Filed May 15, 2000 now U.S. Pat. No. 6,390,676.

BACKGROUND OF THE INVENTION

1. Field of the Invention

The invention relates to a reclosable packaging system for enveloping a product. More particularly, the invention pertains to a reclosable plastic film packaging system using a zipper and straight tear films that are capable of tear propagating along substantially straight lines in response to an applied force sufficient to propagate a tear in the films.

2. Description of the Related Art

Reclosable packages using zipper technology are well known in the art. A conventional reclosable package generally comprises a polymeric envelope comprising overlapping films which are sealed along its outer peripheral edges and having a flexible plastic zipper positioned inward from one of the edges. A plastic zipper generally comprises interlocking zipper tracks positioned below a top edge of the package for opening and closing access to an inner portion of the package. Some prior art packages have also been known to include a moveable slider adjoined to the zipper for assisting with engaging and disengaging the tracks of the zipper. For example, U.S. Pat. No. 5,896,627 discloses a high-strength plastic slider for a reclosable bag that is difficult to separate or pry loose from a zipper on which it has been mounted.

Reclosable bags using zipper technology are known to be useful for storing solid and/or liquid products. They are extremely useful for food storage in a refrigerator or freezer because zipper locking bags typically have very strong seals that are virtually impermeable to air, providing excellent oxygen and moisture barriers that prevent food from spoiling, while allowing easy access to the stored food product. Reclosable zipper bags have also been known to be used by food manufacturers in storing food products in stores for direct sale to consumers. For example, U.S. Pat. No. 6,206,571 teaches a flexible, reclosable bag for storing cereals. In applications such as these, it is generally necessary that the top edge of the package above the zipper be sealed to prevent tampering with the enclosed food product prior to sale. This feature is illustrated in U.S. Pat. No. 6,206,571 wherein a resealable pour spout is located below a sealed top.

When a sealed reclosable bag is used to store a product for sale to consumers, it is necessary that the bag be easily openable by the consumer once they purchase the product. A commonly employed technique for providing an easily openable bag having good tamper resistance includes perforating a portion of the bag between a top edge of the bag and the reclosable zipper and between the side edges of the bag, creating a removable strip above the perforated line. After purchasing the product at a store, the consumer may then tear the removable strip off of the bag revealing the reclosable zipper underneath, and allowing them to access the food product stored therein. Perforation of the film is desirable because it allows the consumer to tear the package along a straight line, allowing for complete removal of the removable strip so that the packaged food product can be easily poured out of the package if desired.

Various techniques have been known in the art to create such perforations, including microperforating and laser scoring. Microperforating involves the mechanical creation of tiny holes or perforations through a material to facilitate tearing along a straight line. Laser scoring involves the creation of tiny holes or perforations through the material using a laser rather than mechanically. Although these techniques are particularly useful for easily tearing the plastic in a particular direction, each has the disadvantage of compromising the integrity of the package by allowing microbes and other potentially dangerous organisms to penetrate the package. This is particularly undesirable when the packaged good is a food product for consumption by humans. Further, laser scoring techniques are also undesirable because they are very expensive to conduct. Therefore it would be desirable to provide a plastic bag that is capable of straight tearing without the need for microperforating or laser scoring a portion of the plastic.

SUMMARY OF THE INVENTION

The invention provides a reclosable film package comprising:

a) first and second overlapping straight-tear films capable of propagating a tear along a locus of points in one of two substantially straight perpendicular lines in response to an applied force sufficient to propagate a tear in the films, the films being sealed together at top, bottom, left and right edges defining an enclosure, the enclosure having sealed bottom, left and right margins extending for a distance away from the bottom, left and right edges toward a center of the films; each film comprising in order from an outside portion of the enclosure to an inside portion of the enclosure:
  i. a nylon or polyester layer;
  ii. optionally, an adhesive layer; and
  iii. a sealant layer;
b) a reclosable zipper substantially parallel with and positioned below the top edge of the films and extending between left and right end points located at the left and right margins; said zipper comprising a first track on the first straight-tear film and a second track on the second straight-tear film, which first and second tracks are adapted to releasably engage each other;
c) a slider moveably attached to said tracks for engaging and disengaging the tracks between the end points;
d) left and right nodules positioned at the left and right end points; and
e) a tear propagation line extending from the left nodule to the right nodule substantially parallel along the zipper, and a tear propagation line extending from each of the left and right nodules substantially parallel along the left and right margins to the top edge of the films, defining a removable tear strip between the left and right margins and above the zipper.

This invention also provides a reclosable film package comprising:

a) first and second overlapping straight-tear films capable of propagating a tear along a locus of points in one of two substantially straight perpendicular lines in response to an applied force sufficient to propagate a tear in the films, the films being sealed together at top, bottom, left and right edges defining an enclosure, the enclosure having sealed bottom, left and right margins extending for a distance away from the bottom, left and right edges toward a center of the films; each film comprising in order from an outside portion of the enclosure to an inside portion of the enclosure:
  i. a nylon layer;

ii. an adhesive layer; and iii. a polyethylene layer;

b) a reclosable zipper substantially parallel with and positioned below the top edge of the films and extending between left and right end points located at the left and right margins; said zipper comprising a first track on the first straight-tear film and a second track on the second straight-tear film, which first and second tracks are adapted to releasably engage each other;

c) a slider moveably attached to said tracks for engaging and disengaging the tracks between the end points;

d) left and right nodules positioned at the left and right end points; and e) a tear propagation line extending from the left nodule to the right nodule substantially parallel along the zipper, and a tear propagation line extending from each of the left and right nodules substantially parallel along the left and right margins to the top edge of the films, defining a removable tear strip between the left and right margins and above the zipper.

The invention further provides a process for forming a reclosable film package comprising:

a) forming first and second straight-tear films by attaching a nylon layer to a sealant layer optionally via an intermediate adhesive layer, said films having top, bottom, left and right edges;

b) forming first and second zipper tracks below and substantially parallel to the top edge of the films, said tracks having left and right end points and said tracks releasably engaging each other;

c) attaching a moveable slider to the tracks such that the slider is capable of engaging and disengaging the tracks between left and right end points;

d) adjoining the first and second straight-tear films by sealing the respective left, right and bottom edge of each film together such that the sealant layers are attached together, and forming left, right and bottom margins, thereby forming an enclosure; and e) forming a left nodule at an intersection of a left zipper end point and the left margin, and forming a right nodule at an intersection of a right zipper end point with the right margin.

The present invention provides a solution to the problems of the prior art. The invention provides a package utilizing a straight tearing film that is easily tearable in a particular direction in response to a stress applied in that direction. The invention also allows for the direction of tearing to be easily changed in a direction perpendicular to the initial tearing direction to facilitate the full removal of a tear strip above a reclosable zipper. The straight tearing films have good toughness, eliminates the need for perforating and provides an excellent barrier to oxygen and moisture while preventing contamination of the food product by microbes or other organisms.

DESCRIPTION OF THE PREFERRED EMBODIMENTS

The invention provides a reclosable film package for storage of solid or liquid products, such as foods. The package is formed by joining together a pair of overlapping, multi-layered straight-tear films that are capable of propagating a tear along a locus of points in one of two substantially straight perpendicular lines in response to an applied force sufficient to propagate a tear in the films.

Figure 1:
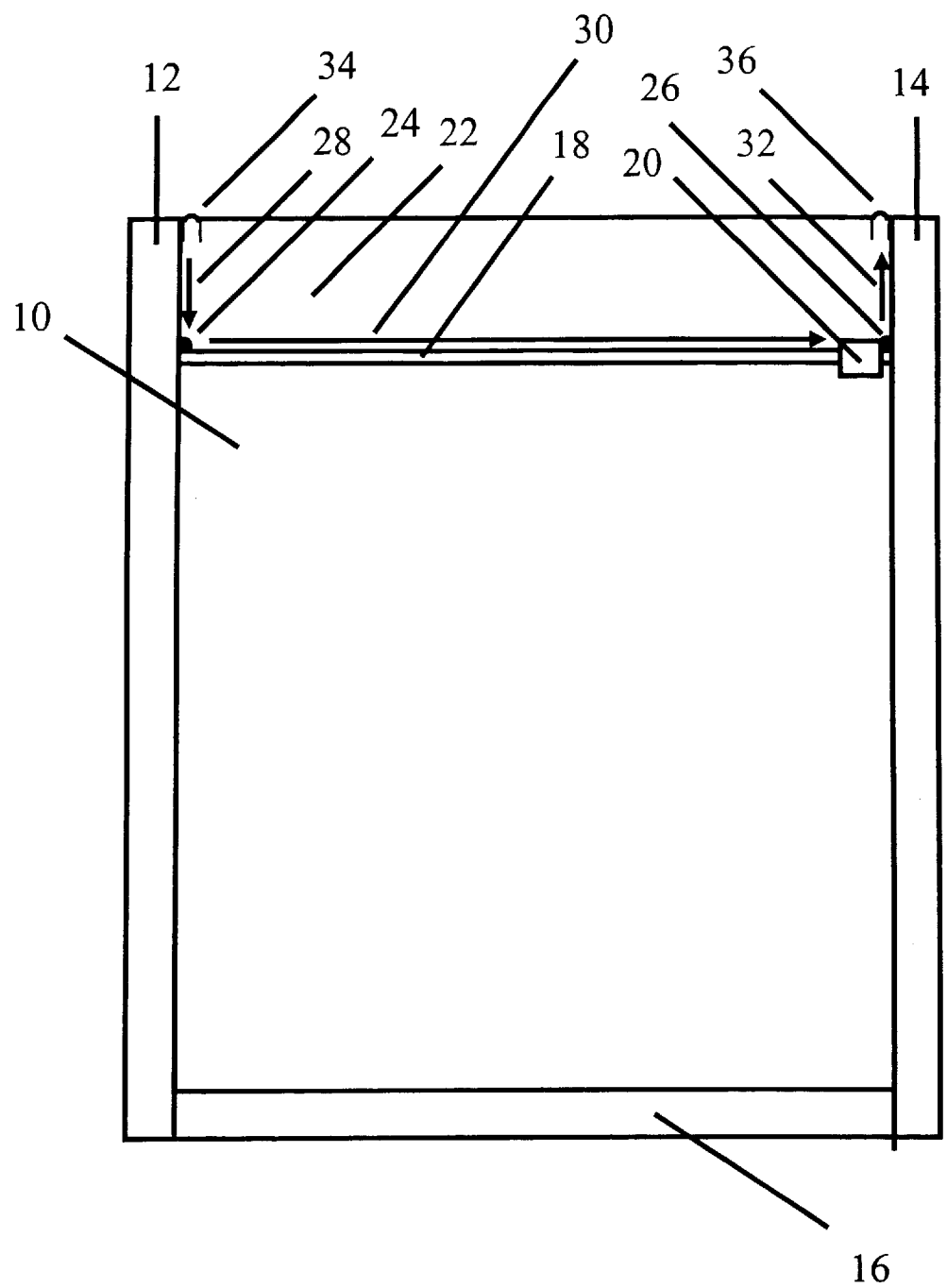
FIG. 1 is a schematic representation of a reclosable bag.

Referring to FIG. 1, a reclosable film package 10 is shown. The package comprises first and second overlapping straight-tear films, each straight-tear film being comprised of an oriented nylon or polyester layer attached to a sealant layer, optionally via an intermediate adhesive layer.

The nylon layer preferably comprises polyamide homopolymers or copolymers selected from aliphatic polyamides and aliphatic/aromatic polyamides having a molecular weight of from about 10,000 to about 100,000. General procedures useful for the preparation of polyamides and polyesters are well known to the art. In the case of polyamides, such may include the reaction of a diamine with a diacid. Useful diacids for making polyamides include dicarboxylic acids which are represented by the general formula:

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula:

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful aliphatic polyamide homopolymers include poly (4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11) and poly(12-aminododecanoic acid) (nylon 12), poly(hexamethylene adipamide) (nylon 6,6), poly (hexamethylene sebacamide) (nylon 6,10), poly (tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), poly (heptamethylene pimelamide) (nylon 7,7), poly (octamethylene suberamide) (nylon 8,8), poly (hexamethylene azelamide) (nylon 6,9), poly (nonamethylene azelamide) (nylon 9,9), poly (decamethylene azelamide) (nylon 10,9), and poly (tetramethylene adipamide (nylon 4,6), and the like. Useful nylon copolymers non-exclusively include caprolactam/ hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), and hexamethylene adipamide-hexamethylene-azelaiamide caprolactam copolymer (nylon 6,6/6,9/6), and the like. Also included are other polyamides which are not particularly delineated here. Of these, preferred polyamides include nylon 6; nylon 6,6; and nylon MXD6 which is a polymer of 1,3-benzenedimethanamine (metaxylenediamine, MXDA) with adipic acid. The most preferred polyamide comprises a blend of nylon 6 and nylon MXD6, such as described in U.S. Pat. No. 5,541,011.

Examples of aliphatic/aromatic polyamides include poly (2,2,2-trimethyl hexamethylene terephthalamide), poly(p-xylylene adipamide), poly(hexamethylene terephthalamide) (nylon 6,T), poly(hexamethylene isophthalamide) (nylon 6, I), poly(dodecamethylene terephthalamide), polyamide 6T/6I, poly(tetramethylenediamine-co-isophthalic acid) (nylon 4,I), polyamide 6/MXDT/I, polyamide MXDI, hexamethylene adipamide/hexamethylene-isophthalamide (nylon 6,6/6I), hexamethylene adipamide/ hexamethyleneterephthalamide (nylon 6,6/6T) and as well as others which are not particularly delineated here. Blends of two or more aliphatic/aromatic polyamides and/or aliphatic polyamides can also be used. Aliphatic/aromatic polyamides can be prepared by known preparative techniques or can be obtained from commercial sources. Other suitable polyamides are described in U.S. Pat. Nos. 4,826, 955 and 5,541,267.

Polyamides used in the practice of this invention may be obtained from commercial sources or prepared in accordance with known preparatory techniques. For example, nylon 6 can be obtained from Honeywell International Inc., Morristown, N.J. under the trademark CAPRON®. Suitable variants of CAPRON® for use in the present invention include CAPRON® 8200 nylon, a balanced nylon 6 having a formic acid viscosity (FAV) of 75, CAPRON® 1767 nylon, a balanced nylon 6 having an FAV of 35, and CAPRON®8224HSL nylon, a heat stabilized, lubricated nylon 6 having an FAV of 60, and CAPRON® 1250 nylon, an amine-terminated nylon 6 with a FAV of 60 and having terminal amino groups of 70 to 78 milliequivalents per gram.

The process of producing polyesters involves the known initial steps of esterification of at least one dibasic acid with at least one polyol, followed by polycondensation which is conducted until the polyester is formed which has the desired viscosity and/or melting point. Suitable polyesters may be produced by condensing an aromatic dibasic acid (including anhydrides and acid esters), such as a dicarboxylic acid or a lower alkyl ester thereof with a polyol such as a glycol. The diacid should be an aromatic, low molecular weight mono-or di-cyclic dibasic acid. Among the dicarboxylic acids and their lower alkyl diesters which may be employed are terephthalic; isophthalic; phthalic; naphthalene dicarboxylic; biphenylene dicarboxylic acid, tetrahydroterephthalic acid, tetrahydroisophthalic acid, tetrahydrophthalic acid, hydronaphthalene dicarboxylic acid, cyclohexanedicarboxylic acid, cyclopentyldicarboxylic acid, cyclooctyldicarboxylic acid, succinic; glutaric acid; sebacic; adipic; azelaic; bibenzoic; pimelic acid, malonic acid, fumaric acid, itaconic acid, their monoesters, their diesters, and mixtures thereof, and bis-p-carboxyphenoxyethane. Useful naphthalene dicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 2,8-isomers may also be used; 4,4'-biphenyldicarboxylic acid, 1,4-napthalene dicarboxylate, 1,3-phenylenediacetic acid, 1,2-phenylenediacetic acid, 1,4-phenylenedipropionic acid, 4-carboxyphenoxy acetic acid, 2,3-napthalalenedicarboxlylate, 1,3,5-benzenetricarboxylic acid, tetrafluoroisophthalic acid, tetrafluoroterephthalic acid, tetrafluorophthalic acid, 2-methoxyisophthalic acid, benzylmalonic acid, 4-bromoisophthalic acid, 3-nitrophthalic acid, 4-nitrophthalic acid, 2,6-naphthalene dicarboxylate, 4,4'-oxy-bisbenzoic acid, 1,4-phenylenediacetic acid, diphenic acid, homophthalic acid, 1,2-phenylenedioxodicarboxylic acid, 1,2,4-benzenetricarboxylic acid, 4,4'-hexafluoro (isopropylidine), 3-fluorophthalic acid, 4-methylphthalic acid, 5-tert-butylisophthalic acid, pamoic acid, 4-bromoterephthalic acid, 4,5-dichlorophthalic acid, and 5-octadecyloxyisophthalic acid. Preferred dibasic acids include terephthalic acid, isophthalic acid, naphthalene dicarboxylic acid and mixtures thereof. The dibasic acids may be used in acid form, acid anhydride form or as their esters such as the dimethyl esters.

One or more of these acids and/or their lower alkyl esters is reacted with at least one di-or tri-functional aliphatic organic polyol compound having at least 2 carbon atoms wherein each functionality is selected from the group consisting of alcohols and amines. Preferred are polyols, which include glycols having from about 2 to about 50 carbon atoms, preferably from about 3 to about 10 carbon atoms and include ethylene glycol, propylene glycol, butylene glycol, 1,3-propanediol, 1,3-butanediol, 1,4-butanediol, dipropylene glycol, 1,5 pentanediol, 1,6-hexanediol, diethylene glycol, 1,4-cyclohexanediol, 1,4cyclohexanedimethanol, neopentyl glycol; 1,8-octanediol, 1,10-decanediol, 1,12-dodecanediol, diethylene glycol, triethylene glycol, tetraethylene glycol, dihydroxy-terminated higher oligomers of ethylene glycol, dimer of trimethylene glycol, trimer of trimethylene glycol, dimer of tetramethylene glycol, trimer of tetramethylene glycol, dihydroxy-terminated higher oligomers of tetramethylene glycol, polyethylene glycol, pentaerythritol, glycerol, 1,6-hexamethylene diol, 1,8-octamethylene diol, 1,4-cyclohexanedimethanol and mixtures thereof. Preferred glycols include ethylene glycol, 1,4-cyclohexane dimethanol diethylene glycol and mixtures thereof. The 1,4-cyclohexanedimethanol may be in the cis or the trans form or as cis/trans mixtures. Since one or more esters may be reacted with one or more glycols, the polyesters are not limited to homopolyesters but also include mixed polyesters such as copolyesters as well as copolymers with other monomers. Preferred difunctional or trifunctional aliphatic compounds are glycols having at least four carbon atoms and preferably having from about 6 to about 12 carbon atoms. Such may have additional functionalities such as acids and compounds having a mixture of at least two of these functionalities.

The polyol component adds flexibility to the reaction product with the aromatic diacid component. In the preferred embodiment, the mole ratio of the aromatic diacid to flexible polyol ranges from about 1:1 to about 1:4, preferably from about 1:1 to about 1:3. Optionally, the polyester may be a terpolymer or tetramer containing an additional modifying component such as a di-, tri- or tetra-functional aromatic or aliphatic moiety wherein each functionality is selected from the group consisting of an acid, alcohol, amine, anhydride, ester, acid halide and compatible mixed functionalities thereof.

Polyethylene terephthalate may be formed from a polymer produced by the polymerization of bis-(2-hydroxyethyl) terephthalate which is itself formed as an intermediate by one of two different methods. One method for producing bis-(2-hydroxyethyl)terephthalate is by direct esterification of terephthalic acid with ethylene glycol as described in U.S. Pat. No. 3,050,533. In this method the by-product of the reaction is water which is distilled from the reaction product Polyesters produced from the above starting materials may be produced similarly under conventional conditions well known to the skilled artisan. Conventional processes for the preparation of polyesters may also be found in U.S. Pat. Nos. 4,568,720 and 5,552,512. The polyester layer preferably comprises polyester copolymers selected from aliphatic and aliphatic/aromatic polyesters having a molecular weight of from about 10,000 to about 100,000. Some of the above polyesters are commercially available and the others can be easily prepared by those skilled in the art using similar, usual means.

The polyester layer may include another polymer to facilitate straight tearing, such as a nylon polymer. In one embodiment, the polyester layer comprises a blend of polyethylene terephthalate and nylon MXD6.

The sealant layer is preferably attached to the nylon or polyester layer by coextrusion, or lamination via an intermediate adhesive layer. Of these, lamination is the most preferred. The sealant layer is preferably a polyolefin, such as a polyethylene or polypropylene, or blends of one or more polyolefins. Other polyolefins may be employed, such as ethylene vinyl acetate, in particular when blended with a polyethylene. Polyethylenes are particularly preferred. Non-limiting examples of suitable materials for the polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred is low density polyethylene.

Any suitable adhesive may be employed. Such adhesives include polyurethanes, epoxies, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The adhesive layer may also optionally comprise a colorant, an ultraviolet light absorber or both. The adhesive layer may be applied by coating, sputtering, coextrusion and the like. Alternatively, one or more adhesive polymers may be directly blended or coextruded into other layers of the film, thus providing adhesion while minimizing the number of layers in the film.

The straight-tear films of the invention may further comprise an oxygen barrier layer, preferably an ethylene vinyl alcohol copolymer layer, between the nylon and polyethylene layers. Such copolymers suitable for use in the present invention can be prepared by the methods disclosed in U.S. Pat. Nos. 3,510,464; 3,560,461; and 3,585,177.

The ethylene vinyl alcohol copolymer can be hydrolyzed from ethylene vinyl acetate copolymer. The degree of hydrolysis can range from 85 to 99.5%. The ethylene vinyl alcohol copolymer preferably contains from about 10 to about 65 mol percent ethylene, and more preferably from about 25 to about 50 mol percent ethylene. Copolymers of lower than about 10 mol percent ethylene tend to be difficult to extrude while those above 65 mol percent ethylene have reduced oxygen barrier performance, as described in U.S. Pat. No. 3,595,740.

Useful ethylene vinyl alcohol copolymers suitable for the present invention are commercially available from a variety of sources. For example, Kuraray of Japan produces an ethylene vinyl alcohol copolymer under the designation "EP-E" which has about 44% ethylene, a number average molecular weight of about 29,500 and melting point of 164° C. Other manufacturers produce suitable ethylene vinyl alcohol copolymers. One suitable copolymer has about 32% ethylene with a melting point of 183° C. Another grade has about 29% ethylene, a number average molecular weight of about number average 22,000 and a melting point of about 188° C. Another described in U.S. Pat. No. 4,252,169 has 40% ethylene, a number average molecular weight of about 26,000 and a melting point of 164° C. The number average molecular weight can be measured by osometry.

Ethylene vinyl alcohol copolymers suitable for use in the invention preferably exhibit good oxygen barrier property such as an oxygen permeability of <1 cc.mil/100 in$^2$/day in 100% oxygen at 25° C.

It is also within the scope of the invention that the straight-tear films may comprise additional layers suitable for the purposes of the invention. For example, the films may further include a moisture barrier layer between the nylon and polyethylene layers. Also, in the preferred embodiment of the invention, a metal foil layer is attached to each straight-tear film on a surface of each nylon layer opposite the adhesive layer. Preferably, this metal foil layer is an aluminum foil. This aluminum foil layer may be printed with any design or indicia as a manufacturer may desire to label the product contained within the package.

Each of the polyethylene films, nylon films, polyester films, optional ethylene vinyl alcohol film, and adhesive layers may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used, for example, in amounts of up to about 10% by weight of the overall composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

One noteworthy characteristic of the films of this invention is that they exhibit excellent gas barrier properties, particularly oxygen barrier properties. Oxygen permeation resistance or barrier may be measured using the procedure of ASTM D-3985. In general, the films of this invention have an oxygen transmission rate (OTR) at 90% relative humidity (RH) of less than about 1.0 cm$^3$/100 in$^2$(645 cm$^2$)/24 hrs/Atm at 25° C. using 100% oxygen, and preferably less than about 0.5 cm$^3$/100 in$^2$(645 cm$^2$)/24 hrs/Atm at 25° C.

Preferably a blend or combination of nylon polymers is produced by a melt extrusion of the nylon components. The composition may be formed by dry blending solid particles or pellets of each of the nylon components and then melt blending the mixture in a suitable mixing means such as an extruder, a roll mixer or the like. Typical melting temperatures range from about 200° C. to about 270° C., preferably from about 210° C. to about 260° C. Blending is conducted for a period of time required to attain a substantially uniform blend. Such may easily be determined by those skilled in the art.

The multilayered straight-tear films of the invention may be formed by any conventional technique for forming films, including coextrusion and extrusion lamination. The preferred method for making multilayer film is by coextrusion. For example, the material for the individual layers, as well as any optional layers, are fed into infeed hoppers of the extruders of like number, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. After the formation of the coextruded films, the films are then biaxially oriented. These orientation processes may be by several methods, including sequential and simultaneous orientation. In the sequential process the films are first oriented in one direction, for example the machine direction, after which they are oriented in the normal direction, for example the transverse direction. In the simultaneous orientation process the films are oriented in both the machine and transverse directions at the same time. A blown film process may also be used to biaxially orient the film, where the blown unoriented film is subsequently oriented in bot the machine and transverse direction by expanding the solidified polymer "tube" at temperatures below the melting points of the polymers used to compose the film. In each of the above instances the oriented films are preferably subsequently heat set at elevated temperatures as a means of controlling the films shrinkage properties. Processes of coextrusion to form film laminates are generally known. Alternatively, the individual layers may first be formed into sheets and then laminated together under heat and pressure with or without intermediate adhesive layers.

Lamination techniques are well known in the art. Typically, laminating is done by positioning the individual layers on one another under conditions of sufficient heat and pressure to cause the layers to combine into a unitary film. For example, the nylon film, polyethylene film, optional ethylene vinyl alcohol film and adhesive layers are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

Films produced according to the present invention should be oriented by stretching or drawing the films at draw ratios of from about 1.1:1 to about 10:1 in at least one direction, and preferably at a draw ratio of from about 2:1 to about 5:1 in at least one direction. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film. Such films may be stretched or oriented in any desired direction using methods well known to those skilled in the art. The film may be stretched biaxially in both the longitudinal direction and the transverse direction. Straight tear films may be formed by a judicious selection of nylon or polyester polymer types, molecular weight and degree of orientation. In general, a straight tear film propagates a tear in the film along a straight line which does not wander more than about 3 mm transversely from a tear line which is parallel to the margin edges 12, 14 and zipper 18 of the enclosure. One useful straight tear nylon film comprises a blend of nylon 6 and nylon MXD6 and is commercially available from Idemitsu of Tokyo, Japan The thickness of each of the straight-tear films preferably range from about 0.05 mils (1.3 ($\mu$m)) to about 50 mils (1270 ($\mu$m)), and more preferably from about 0.05 mils (1.3 ($\mu$m)) to about 10 mils (254 ($\mu$m)). Most preferably, each straight tear film has a thickness of less than about 5 mils (127 $\mu$m). While such thicknesses are preferred as providing a readily flexible film, it is to be understood that other film thicknesses may be produced to satisfy a particular need and yet fall within the scope of the present invention.

Once first and second straight-tear films of the invention are formed, a reclosable zipper 18 comprising first and second zipper tracks is formed below and substantially parallel to the top edge of the films. The zipper tracks may be formed in a number of conventional ways. The may be formed by passing the straight-tear films through a mold such that complementary tracks are formed. They may be formed by coextruding a polymer through die having the shape of complementary tracks and onto a film layer. The tracks may also be formed by extrusion of a polymer through the same die as one of the film layers, with the die shaped to form complementary tracks on coextruded layers. Additionally, the tracks may be formed by extruding a polymer through a die and solidifying the polymer, followed by attaching the tracks to the films with heat or with an adhesive. Suitable adhesives include those described above. These techniques are intended to be non-exclusive and any means known in the art for forming zipper tracks may be used.

In the preferred embodiment of the invention, the first and second complementary zipper tracks are located at an inner area of the package and extend between and are spaced from the left and right edges of the films, terminating at left and right end points. Generally, the zipper tracks comprise flexible complementary polymeric strips that are capable of releasably engaging each other, the first zipper track having a male rib and groove configuration and the second zipper track having a female rib and groove configuration. Such zippers are well known in the art for use with food storage bags and can be seen, for example, in U.S. Pat. Nos. 5,067,208, 5,896,627, and 5,482,375. The strips may be formed of any suitable polymeric material as is known in the art, which includes but is not limited to the nylon homopolymers and copolymers listed above or blends and mixtures thereof, polypropylene, polyethylene and polystyrene and the like.

Following application of the zipper tracks, a moveable slider 20 is attached to the tracks such that the slider 20 is capable of engaging and disengaging the tracks of the zipper 18 between the first and second end points of the tracks. The slider 20 engages the tracks by pressing the complementary tracks together when it slides along the length of the zipper. The slider 20 may be attached to the zipper using techniques known in the art, such as those shown in U.S. Pat. Nos. 5,067,208, 5,896,627, 5,924,173 and 6,148,588. The slider is preferably formed from a single piece of molded polymer. Suitable polymers are known in the art and non-exclusively include nylon homopolymers and copolymers and blends thereof, polypropylene, polyethylene and polystyrene and the like.

Figure 2:
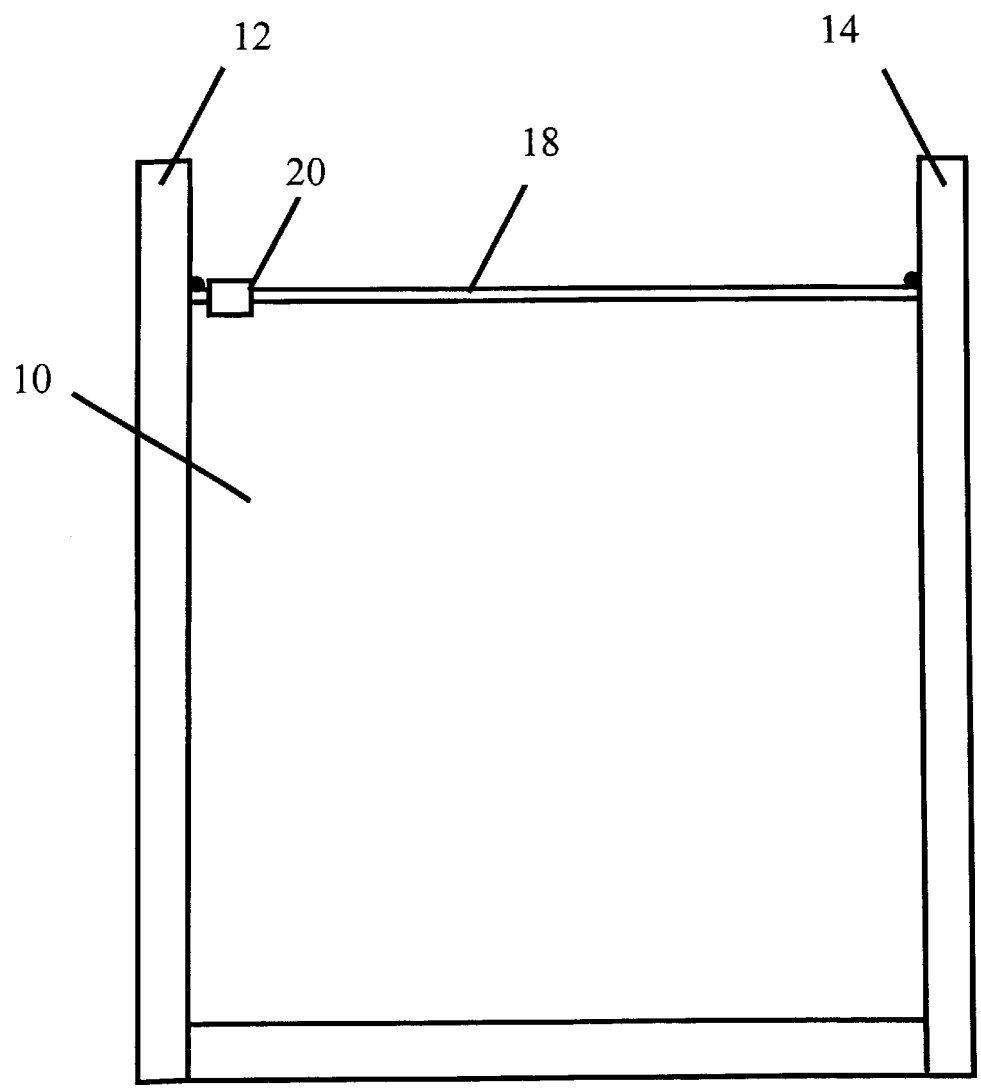
FIG. 2 is a schematic representation of a reclosable bag after removal of the tear strip.

Once the slider is attached, the first and second straight-tear films are adjoined by sealing the opposing left and right edges and a bottom edge of each film together such that the polyethylene layers are attached together, forming an enclosure. The films may be attached either by thermally sealing them together or by using an adhesive. Most preferably they are adjoined by thermal sealing. The films are sealed together at the left, right and bottom edges, forming a left margin 12, a right margin 14 and a bottom margin 16. As can be seen in FIGS. 1 and 2, the margins extend for a distance away from the bottom, left and right edges of the films toward a center of the films. As can also be seen from the figures, the left margin 12 and the right margin 14 extend to the left and right end points of the zipper tracks. The thickness of each of the left, right and bottom margins is not intended to be limiting to the invention and may be as desired. The formation of the margins creates a removable tear strip 22 above the zipper 18 and between the left margin 12 and right margin 14, as seen in FIG. 1.

After the films are sealed together, a left nodule 24 is formed at the intersection of the left zipper end point and the left margin 12 and a right nodule 26 is formed at the intersection of the right zipper end point and the right margin 14. These nodules are preferably heat sealed areas formed with a welder or heat bar that melts through each of the first and second straight-tear films.

After the nodules are formed, the enclosure may be filled with a product, such as a liquid or solid food product. The zipper is then preferably closed and the top edge of the films sealed together above the zipper. The top edge is preferably thermally sealed using heat and pressure or sealed alternatively using an adhesive as described above. Of these, thermal sealing is preferred. As shown in FIG. 1, the reclosable package of the invention may further preferably comprise tear notches 34 and 36 along the top edge of the adjoined films directly above each of the left and right nodules. In this embodiment, the tear notches 34 and 36 facilitate the straight tearing of the films along a locus of points in one of two substantially straight perpendicular lines in response to an applied force sufficient to propagate a tear in the films. Tear notches are well known in the art and facilitate the tearing of the films. These may also comprise a polymeric strip, a polymeric tab or a notch formed by making two small cuts in the films along the top edge directly above each of the left and right nodules.

In use, the films are torn from the top left corner of the tear strip 22 down a locus of points along the left margin 12 in a direction of arrow 28 until to left nodule 24 is reached. At left nodule 24, the tearing direction is turned to the direction of arrow 30 perpendicular to direction 28, and the films are the torn together along a locus of points across the film above the zipper 18 to right nodule 26. At the right nodule 26, the tearing direction is turned to a direction of arrow 32 perpendicular to direction 30 and parallel to direction 28. The films are torn together along right margin 14 to the top edge of the films, completely removing tear strip 22. After the tear strip is removed, the portions of the left margin 12 and right margin 14 above the zipper 18 remain, and the closed zipper 18 is revealed. This can be seen in FIG. 2. The package may then be opened by sliding the slider 20 along the zipper 18 to disengage the interlocked zipper tracks, revealing the product within the enclosure.

This product and process avoids the need for microperforating or laser scoring of the films to facilitate tearing of the films. These steps are undesirable because they compromise the integrity of the packaging by allowing microbes and other dangerous organisms to penetrate the package and reach the product stored therein. By avoiding these techniques, optimal integrity of the bag and product are maintained, as well as saving the extra cost involved with applying these techniques. Therefore, a low cost, high quality product is achieved.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A process for forming a reclosable film package comprising:
   a) forming first and second straight-tear films by attaching a nylon or polyester layer to a sealant layer optionally via an intermediate adhesive layer, said films having top, bottom, left and right edges;
   b) forming first and second zipper tracks below and parallel to the top edge of the films, said tracks having left and right end points and said tracks releasably engaging each other;
   c) attaching a moveable slider to the tracks such that the slider is capable of engaging and disengaging the tracks between left and right end points;
   d) adjoining the first and second straight-tear films by sealing the respective left, right and bottom edge of each film together such that the sealant layers are attached together, and forming left, right and bottom margins, thereby forming an enclosure; and
   e) forming a left nodule at an intersection of a left zipper end point and the left margin, and forming a right nodule at an intersection of a right zipper end point with the right margin.

2. The process of claim 1 further comprising attaching the nylon or polyester layer and the sealant layer via an adhesive.

3. The process of claim 1 further comprising the steps:

f) filling the enclosure with a product;

g) engaging the first and second zipper tracks; and g) sealing a top edge of the films above the zipper.

4. The process of claim 1 further comprising attaching an oxygen barrier layer between the nylon and sealant layers prior to step (b).

5. The process of claim 2 further comprising attaching a metal foil layer to a surface of each nylon or polyester layer opposite the adhesive layer of each straight-tear film prior to step (b).

6. The process of claim 1 wherein the nylon or polyester layer comprises a nylon selected from the group consisting of nylon 6, nylon MXD6 and combinations thereof.

7. The process of claim 6 wherein the nylon or polyester layer comprises a blend of nylon 6 and nylon MXD6.

8. The process of claim 1 wherein the sealant layer is a polyethylene.

9. The process of claim 8 wherein the polyethylene layer comprises a polyethylene selected from the group consisting of low density polyethylene, linear low density polyethylene, linear medium density polyethylene, linear very-low density polyethylene, linear ultra-low density polyethylene, high density polyethylene and combinations thereof.

10. The process of claim 2 wherein the adhesive layer comprises a polyolefin.

11. The process of claim 1 further comprising forming left and right tear notches adjacent to the left and right margins and along the top edge of the films.

12. The process of claim 3 wherein the product comprises food.

13. The process of claim 1 wherein the nylon or polyester layers and the sealant layers are attached by coextrusion.

14. The process of claim 1 wherein the nylon or polyester layer and the sealant layers are attached by lamination.

* * * * *